(12) United States Patent
Nishikawa

(10) Patent No.: US 7,906,056 B2
(45) Date of Patent: Mar. 15, 2011

(54) METHOD FOR FORMING HEAD PART OF CLOSED-TYPE TUBE, METHOD FOR MANUFACTURING CLOSED-TYPE TUBULAR CONTAINER, AND CLOSED-TYPE TUBULAR CONTAINER

(75) Inventor: Kazuo Nishikawa, Yao (JP)

(73) Assignee: Kansai Tube Co., Ltd., Osaka (JP)

( * ) Notice: Subject to any disclaimer, the term of this patent is extended or adjusted under 35 U.S.C. 154(b) by 77 days.

(21) Appl. No.: 11/597,338

(22) PCT Filed: Mar. 3, 2006

(86) PCT No.: PCT/JP2006/304110
§ 371 (c)(1),
(2), (4) Date: Nov. 21, 2006

(87) PCT Pub. No.: WO2007/043198
PCT Pub. Date: Apr. 19, 2007

(65) Prior Publication Data
US 2009/0057322 A1  Mar. 5, 2009

(30) Foreign Application Priority Data
Oct. 12, 2005  (JP) ................. 2005-297122

(51) Int. Cl.
*B29C 45/14* (2006.01)
*B29C 49/08* (2006.01)
*B29C 70/80* (2006.01)
*B65B 51/10* (2006.01)
*B67B 3/04* (2006.01)
*A23G 1/22* (2006.01)

(52) U.S. Cl. ...... 264/274; 264/267; 264/268; 264/271.1; 264/275; 264/292; 53/141; 53/478; 53/485; 53/486; 53/487; 53/489; 425/112; 425/125; 425/128

(58) Field of Classification Search .................. 264/267, 264/268, 279, 292, 271.1, 274, 275; 425/112, 425/125, 128; 53/141, 478, 485, 486, 487, 53/488, 489
See application file for complete search history.

(56) References Cited

U.S. PATENT DOCUMENTS
2,878,513 A * 3/1959 Slaughter .................... 264/550
(Continued)

FOREIGN PATENT DOCUMENTS
JP          39-8078          5/1964
(Continued)

*Primary Examiner* — Christina Johnson
*Assistant Examiner* — Atul Khare
(74) *Attorney, Agent, or Firm* — Flynn, Thiel, Boutell & Tanis, P.C.

(57) ABSTRACT

A cup-shaped closing material having a convex section is fitted on a protrusion-like engagement section of a distal end of a mandrel with a gap from the engagement section of the mandrel, a molten resin is then disposed in a cavity of a molding die and a holepin having an outer peripheral section of a distal end that is smaller than an outer periphery of the distal end surface of the convex section of the closing material is pressed against the distal end surface of the convex section of the closing material, whereby the distal end surface of the convex section of the closing material is pleated to form an annular protrusion section at the outer peripheral section, and the molten resin is caused to envelope the annular protrusion section, while being pushed and charged into the cavity, whereby the head part with the closing material attached thereto is formed.

9 Claims, 9 Drawing Sheets

(a)

(b)

U.S. PATENT DOCUMENTS

| | | | | |
|---|---|---|---|---|
| 4,352,775 A | * | 10/1982 | Magerle | 264/500 |
| 5,225,132 A | * | 7/1993 | Farina | 264/148 |
| 5,556,678 A | * | 9/1996 | Jupin et al. | 428/36.6 |
| 6,129,880 A | * | 10/2000 | Kieras et al. | 264/230 |
| 6,210,621 B1 | * | 4/2001 | Usen et al. | 264/263 |
| 6,358,454 B1 | * | 3/2002 | Scheifele | 264/249 |

FOREIGN PATENT DOCUMENTS

| | | | |
|---|---|---|---|
| JP | 61-2489 | | 1/1986 |
| JP | 62-69438 | | 5/1987 |
| JP | 62-165248 | | 10/1987 |
| JP | 64-7850 | | 2/1989 |
| JP | 3-20337 | | 3/1991 |
| JP | 5-200874 | | 8/1993 |
| JP | 6-179462 | | 6/1994 |
| JP | 7-7921 | | 2/1995 |
| JP | 7-28064 | | 5/1995 |
| JP | 2002-192546 | | 7/2002 |
| JP | 2002225057 A | * | 8/2002 |
| JP | 2002-355927 | | 12/2002 |
| JP | 2005-161370 | | 6/2005 |

* cited by examiner (a) (b)

(a)

(b)

(c)

(d)

(e)

(f)

METHOD FOR FORMING HEAD PART OF CLOSED-TYPE TUBE, METHOD FOR MANUFACTURING CLOSED-TYPE TUBULAR CONTAINER, AND CLOSED-TYPE TUBULAR CONTAINER

TECHNICAL FIELD

The present invention relates to a method for forming a head part of a closed-type tube suitable for use in the manufacture of a tubular container of a type having a closed-type head part formed by using a compression method for increasing gas barrier properties of the head part in a tubular container used for containing food, seasonings, cosmetics, drugs, toothpaste, adhesives, creams, and the like, and also relates to a method for manufacturing a closed-type tubular container, and a closed-type tubular container.

BACKGROUND ART

Tubular containers having a closed-type head part designed to prevent the degradation, etc., of contents have been developed for containing food, medical products, industrial products, hair dyes, and the like.

Such tubular containers are typically of the so-called aluminum tube type and laminated tube type. With the former type, aluminum slag is introduced into a cavity and pressure is applied to the aluminum slag by inserting a mandrel into the cavity, thereby producing an aluminum tube in which the head part and body part are integrated (Patent Document 1). With the latter type, a flat laminated sheet is rounded in advance into a tubular shape, a tubular body part is formed by side seaming, and then a laminated tube is obtained by attaching a head part to the body part. A method for cutting and welding the body part in the laminated tube is described in Patent Document 2, and a compression method such as described in Patent Document 3 is an example of a method for forming a head part by attaching a head part to a body part.

Tubular containers accommodating food, medical products, industrial products, hair dyes, and the like are required to protect the contents thereof. Thus, gas-barrier ability and light-shielding ability are important due to concerns about the oxidation of the contents caused by oxygen penetration from the outside and scattering of volatile components contained in the contents to the outside. In aluminum tubes, because the body part and head part containing a closing film in the opening section are integrally molded from aluminum having a high ability to protect the contents, sufficient properties required to protect the contents are obtained.

However, in the case of a laminated tube, for example, because the material of the head part molded by the compression method is a plasticizable plastic material and because the body part and the head part are not molded integrally, the ability to protect the contents causes concerns. Thus, polyolefin resins, in particular polyethylene as a market base material, has been used as a material constituting the inner and outer layers of the body part of the laminated tube because of hot processability, chemical stability, flexibility, water resistance, utility, safety and sanitary properties, material cost thereof, etc., and polyethylene is most often used for the head part to provide for good bonding ability with the body part, and the ability of these portions to protect the contents is problematic. Furthermore, a closing film is often formed to protect the contents, but if the head part is closed with polyethylene, then it is difficult to open for use and, therefore, it becomes necessary to close the opening of the head part with another member.

From the above-described standpoints, aluminum tubes are presently used for the tubular containers accommodating medical products that require a high degree of contents protection. However, because aluminum tubes have a lower shape restoration capacity than laminated tubes, the convenience of use thereof is degraded by deformation. Furthermore, aluminum tubes are inferior to laminated tubes in terms of printing ability. For this reason, there is a strong demand for laminated tubes in the industrial circles.

Accordingly a variety of attempts have been made to improve the ability of laminated tubes to protect their contents. For example, with respect to the body part of a laminated tube, an ability to protect their contents is provided by using aluminum, an inorganic oxide vapor-deposited film, or a plastic film with a high barrier ability such as EVOH, as an interlayer of a laminated sheet. As for the head part, Patent Document 4 discloses introducing an aluminum intermediate member into the inner side of the head part, and Patent Document 5 discloses a so-called membrane tube having a cup-shaped closing member. The membrane tube is also advantageous from the standpoint of tampering prevention because it is difficult to reseal.

In a method for manufacturing the laminated tube, as shown in FIG. 8, a cup-shaped closing material 42 is produced by deep drawing from a laminate original sheet comprising an Al foil or the like as a core material, and this closing material 42 is fitted onto an engagement section 41, which is the distal end of the mandrel 40. When the closing material 42 is fitted to the mandrel 40, the inner diameter of the convex section of the closing material 42 molded in advance to have a cup-like shape is molded to be somewhat smaller than the outer diameter of the engagement section 41, which is the distal end of the mandrel 40, and the convex section of the closing material 42 is forcibly pulled on the engagement section 41 of the mandrel 40, whereby the closing material 42 is held by using the elastic force, repulsion force, dead holding ability, and frictional force of the closing material 42 on the mandrel 40, so that the closing material is prevented from falling off. A compression method is publicly known by which, after such a fitting for structural integration with the distal end of the mandrel 40 has been made, a pressure is applied to a molten resin 46 that is put in position in a cavity 45, and a closed-type head part is molded at the tubular body part, while forming the opening portion in the head part with a holepin 47.

When the contents accommodated in the closed-type container manufactured in the above-described manner is to be used, the distal end surface of the convex section of the closing material exposed in the opening portion of the head part has to be pierced with a needle-shaped object. Because the closing material has to have a high strength to withstand processing such as deep drawing, the force necessary to pierce the closing material with the needle-shaped member is larger than the joining force between the closing material and head part and a problem is associated with the closing material falling into the tubular container. Thus, the closing material is required to have the following functional properties: (i) ability to withstand deep drawing, (ii) sufficient ability to retain shape in the compression process following the deep drawing, and (iii) ability to be reliably opened with a needle-shaped member, and there is a trade-off relationship between the properties (i) and (iii).

A structure is also known in which, with the foregoing in view, the outer peripheral surface of the convex section of the closing material is embedded in the rear face of the head part in order to augment the joining force of the closing material and head part (see Patent Document 6).

With such a closing material, a protruding section is formed outwardly at the outer peripheral surface of the convex section of the closing material by deep drawing and then the closing material is mounted on the mandrel and a head part is formed by the compression method. However, a process for forming in advance the protruding section at the outer peripheral surface of the convex section of the closing material is necessary. Moreover, the distal end of the protruding section is weakened and sometimes even broken when the protruding section is mechanically molded. Yet another problem is that when the head part is formed by a compression method, the protruding section formed outwardly from the outer peripheral surface of the convex section of the closing material becomes a hindrance and the molten resin cannot properly flow around to the distal end of the head part.

Patent Document 1: Japanese Patent Publication No. 2005-161370A
Patent Document 2: Japanese Patent Publication No. 61-2489B
Patent Document 3: Japanese Patent Publication No. 64-7850B
Patent Document 4: Japanese Patent Publication No. 3-20337B
Patent Document 5: Japanese Patent Publication No. 2002-192546A
Patent Document 6: Japanese Utility Publication No. 62-69438A

DISCLOSURE OF THE INVENTION

Problems that the Invention is to Solve

The inventors have discovered that forming an annular protrusion section in the outer peripheral surface of the distal end surface of the convex section of the closing material and enveloping this annular protrusion section with a molten resin is effective for preventing the closing material from falling into the container when the closing material is pierced with a needle-shaped member. It was also found out that a sufficient support force of the closing material is not obtained unless the protrusion width of the annular protrusion section is formed to be uniform and small from the base to the distal end thereof.

It is an object of the present invention to provide a tubular container which makes it possible to prevent the closing material from falling in during opening by forming an annular protrusion section of a small width in the outer peripheral section of the distal end surface of the convex section of the closing material by using stresses generated during filling with a molten resin under pressure in the compression method and forming a head part by enveloping the annular protrusion section with the molten resin, in which the process of forming a protruding section at the outer peripheral surface of the convex section of the closing material prior to the compression process is omitted.

Means for Solving the Problems

The inventors have created the following forming method for resolving the above-described problems.

(1) The present invention provides a method for forming a head part of a closed-type tube by forming a head part with a closing material attached thereto onto a tubular body part by using a compression method, wherein a cup-shaped closing material having a convex section is fitted on a protrusion-like engagement section of a distal end of a mandrel so that a clearance is provided between a rear side of a distal end surface of the convex section of the closing material and a distal end of the engagement section of the mandrel, a molten resin is then disposed in a cavity of a molding die and a holepin having an outer peripheral section of a distal end that is smaller than an outer periphery of the distal end surface of the convex section of the closing material is pressed against the distal end surface of the convex section of the closing material, whereby the distal end surface of the convex section of the closing material is pleated to form an annular protrusion section in the outer peripheral section, the mandrel is inserted under pressure into the cavity of the molding die and the molten resin is caused to envelope the annular protrusion section, while being pushed and charged into the cavity, whereby the head part with the closing material attached thereto is formed.

By employing this method for forming a head part, when the closing material is pierced by a needle-shaped member, even when the closing material having a strength sufficient to withstand deep drawing receives a force that enables the piercing thereof, a bonding section of the closing material and the head part can be provided with a strong joining force preventing the closing material from falling down inside the container.

In accordance with the present invention, a clearance has to be provided between the rear side of the distal end surface of the convex section of the closing material and the distal end of the mandrel when the cup-shaped closing material having the convex section is fitted on the distal end of the mandrel in the compression process. Therefore, the closing material has to be formed by deep drawing so that the height of the convex section of the closing material is larger than that of the convex section at the distal end of the mandrel when the closing material is fitted on the distal end of the mandrel.

Here, from the standpoints of hot processability, flexibility, resistance to water, chemical resistance, utility, safety and sanitary properties, material cost, etc., polyolefin resins, in particular polyethylene is preferred as the molten resin serving as a material for the head part.

Furthermore, the tubular body part may be either a cylindrical laminated tube or a polytube, but a material with gas-barrier properties is used therefor.

The laminated tube is formed, for example, by manufacturing an original sheet from a laminated sheet having a three-layer structure comprising an inner layer and an outer layer, both formed from sealants, and a barrier material as an interlayer, cutting this original sheet, and forming the cut sheet into a tube by side seaming. A polyolefin resin (in particular, a low-density polyethylene resin layer) that is chemically inert and has appropriate processability is preferably used as the sealant of the inner and outer layer. Low-density polyethylene (LDPE), linear-chain low-density polyethylene resin (L-LDPE), and non-oriented polypropylene resin may be also used. Furthermore, for example, an aluminum foil, alumina-deposited PET, silica-deposited PET, ethylene vinyl alcohol, silica-deposited polyamide, or a Nylon resin can be used as the barrier material. Among them, using an aluminum foil is preferred.

A multilayered polytube is preferred as the aforementioned polytube. For example, an inner layer is formed from a sealant by an extrusion molding method, and an outer layer composed of a plastic material having barrier properties, for example, ethylene vinyl alcohol or a Nylon resin is laminated thereon by an extrusion molding method. In particular, it is preferred that the inner layer side be covered with a polyolefin resin (in particular, a polyethylene resin) that is chemically inert and has appropriate processability, thereby protecting a barrier film body.

An ethylene-carboxylic acid copolymer (EMAA or EAA) is preferred as an adhesive layer used in the lamination of the laminated tube. Other adhesives, for example, a two-liquid reactive type are sometimes used as the other adhesive layer, but though a certain initial bonding strength is demonstrated in such cases, it is readily affected by permeation and attack of the contents components. In particular, when the container is filled with contents containing a large amount of solvent components, the adhesive layer is often fractured causing delamination.

The cup-shaped closing material preferably comprises a synthetic resin sheet. It is especially preferred that a polyolefin resin film be used for the outermost layer that is exposed to the atmosphere. Properties of the polyolefin resin films include elongation and resistance to rupture that are especially necessary for the outermost layer in deep drawing. Furthermore, the material used for the outermost layer has a portion exposed to the atmosphere and is, at the same time, joined to the head part on the tubular container. Therefore, this material preferably has a good heat-weldability with the head part. Because a polyolefin resin is preferred as the material of the head part, as described hereinabove, a polyolefin resin, in particular, a polyethylene resin, is preferably used for the outermost layer of the closing material. Furthermore, among the polyethylene resins, L-LDPE is especially preferred because it excels in deep drawing ability and folding processability. However, any polyolefin resin having heat-sealing compatibility with the resin of the inner surface of the head part of the tubular container may be used. Thus, LDPE, HDPE, ethylene-vinyl acetate copolymer (EVA), and polypropylene (CPP) may be used.

On the inner side of the polyolefin resin that is the outermost layer, a first biaxially oriented polyester film, metal film, and second biaxially oriented polyester film are preferably laminated, in that order. The first and second biaxially oriented polyester films play an important role of reinforcing the metal foil and also providing for the balance of strength on the inner and outer sides of the metal foil as a center. Polyethylene terephthalate (PET) is preferred as the polyester due to availability, strength, and toughness thereof, but polyethylene isophthalate, polybutylene terephthalate, polyethylene naphthalate or the like can be also used. Furthermore, besides the polyester film, a biaxially oriented Nylon film that excels in toughness can be also used. Typical foils such as an aluminum foil, a stainless steel foil, and a copper foil, or alloy foils can be used as the metal foil. From the standpoints of availability, cost, elongation, etc., aluminum foil and aluminum alloy foil are especially preferred.

(2) The present invention also provides the method for forming a head part in a closed-type tube according to (1) above, wherein the clearance between the rear side of the distal end surface of the convex section of the closing material and the distal end of the engagement section of the mandrel is 0.5 mm to 5.0 mm.

When the clearance between the rear side of the distal end surface of the convex section of the closing material and the distal end of the engagement section of the mandrel is less than 0.5 mm, a sufficient annular protrusion section is not formed. On the other hand, in typical closed-type tubes with a diameter of 13 mm to 40 mm, the depth of the open section thereof is for practical purposes about 1.0 to 2.0 mm, and when the clearance exceeds 5.0 mm, the height of the annular protrusion section becomes too large, which is undesirable from the standpoint of molding the head part. Furthermore, it is preferred that the clearance between the rear side of the distal end surface of the convex section of the closing material and the distal end of the engagement section of the mandrel be 1.0 mm to 3.5 mm.

(3) The present invention also provides the method for forming a head part of a closed-type tube according to (1) or (2) above, wherein a concave section is formed in the distal end surface of the holepin.

As shown in FIG. 9(a), a holepin 49 in accordance with the present invention has a concave section 50 formed in the distal end surface. FIG. 9(b) is a cross-section along b-b in FIG. 9(a). As shown in FIG. 9(b), the concave section 50 in the distal end section of the holepin is a concave curved recess. Using the holepin of this structure, makes it possible to absorb a thickness variation in the closing material, apply pressure to the closing material by the corners of the inner peripheral surface of the holepin, and prevent the displacement of the closing material. A communicating hole 58 is provided in the bottom section. The concave section does not necessarily have a concave curved surface, as shown in the figure.

(4) The present invention also provides the method for forming a head part of a closed-type tube according to any one of (1) to (3) above, wherein the distal end surface of the mandrel onto which the closing material is fitted is a convex curved surface.

As shown in FIG. 10, the distal end surface R of the distal end portion of the die or the mandrel 22 that can be detachably attached to the die is formed to have a convex curved surface. In particular, when this die or mandrel is used in combination with the holepin 49, the closing material that has been fitted by the effect of the R-shape (i.e., rounded shape) of the distal end surface has a high resistance to displacement and a protrusion uniformly expanding outwardly of the circumference can be formed with a good stability. Furthermore, due to the convex curved surface shape thereof, the distal end surface of the mandrel can be flexibly adapted to the setting of the die or variations of the material thickness in the closing material.

(5) The present invention also provides a method for forming a head part of a closed-type tube by using a mandrel, wherein the mandrel forms a head part that is provided at the end of the mandrel supporting a hollow section of a tubular body part and has a closing material attached thereto by rotation to a vertical position from a horizontal position in which the hollow section of the tubular body part is supported on the mandrel, the tubular body part having one end thereof open and the other end thereof at which the head part provided with the closing material is formed, the mandrel comprising a stationary part and a sleeve fitted externally thereon and capable of sliding back and forth, and when the sleeve is in the vertical position, the movement induced by its weight is inhibited by a magnet. The sleeve can slide back and forth with respect to the stationary part, and when the tubular container is removed from the mandrel after the closed head part has been molded, the sleeve slides in front of the stationary part, following the movement of the tubular container, and the hollow section is filled with the air from the air supply channel provided in the mandrel via the inside of the sleeve, thereby preventing the deformation or collapse of the tubular body part due to a pressure reduction in the hollow section.

After the molded tubular container has been removed from the mandrel, a tubular container is again fitted on the mandrel, and the sleeve accordingly returns to the original position, while being in contact with the inner surface of the tubular body part. As the mandrel rotates from the horizontal position into the vertical position and makes a transition to the predetermined molding of the closing side, the sleeve is maintained in the normal position by the inner surface of the tubular container. At this time, if the inner diameter of the tubular container is large, this inner surface cannot hold the sleeve, and the sleeve tends to move due to its weight to the position below the normal position. In accordance with the present invention, the displacement of the sleeve due to its weight is prevented by using a magnet.

The present invention will be described below with reference to the appended drawings. FIG. 11 illustrates an example in accordance with the present invention in which a mandrel is employed in a die for molding a head part of a tubular container and is an explanatory partial cross-sectional view of the die. In FIG. 11, the reference numeral 23 stands for a stationary part, 28—a sleeve, 29—a mandrel supporting the tubular body part, 9—an air supply channel, 59—a magnet.

FIG. 11 shows a state in which the sleeve has advanced forward with respect to the stationary part. This is a state in which, when the finished tubular container is taken out, the sleeve moves forward against the magnetic force of the magnet 59, following the operation of the tube. At this time, the air is supplied from an air supply channel 9 provided in the mandrel via a gap between the sleeve and the stationary part toward the taken-out tubular container that would be brought into a reduced-pressure state otherwise, as shown by the arrows in FIG. 11, thereby preventing the tubular container from deforming and collapsing.

When a tubular body part with a non-molded head part is mounted in the next molding cycle, the sleeve is pushed toward the mandrel, attracted to the magnet, and returned to the original position.

A transition is then made to a process of molding the head part in the tube mounted on the mandrel and the mandrel at this time assumes a vertical state, but the sleeve is reliably held in the normal position thereof by the magnet against its weight. Therefore, the sleeve is not displaced even when the inner diameter of the mounted tube is large.

Besides a magnet, a spring or the like can be also considered as a means for holding the sleeve. However, with the spring, the force that tends to return the sleeve to the normal position is applied to the sleeve at all times and this force sometimes returns the sleeve to the normal position before the air is supplied in an amount sufficient so as to compensate any pressure reduction in the hollow section inside the tubular container when the tubular container is taken out after molding, thereby making it impossible to reliably perform the predetermined action.

In the present embodiment, the magnet 59 is provided in the form of a ring, but in another implementation mode, the end section of the mandrel can be composed of a magnet, or small magnets can be embedded in the sleeve or end section of the mandrel.

As described hereinabove, in accordance with the present invention, the sleeve for supplying the air into the hollow section of the tubular container, which would be brought into a reduced-pressure state without an air supply when the tubular container having one end thereof closed is taken out from the die after molding, reliably moves forward and performs the predetermined action when the molded product is taken out. Furthermore, the sleeve is held with a good stability in the normal position, without any displacement, by a magnet when the die assumes a vertical position. Therefore, because the closing section can be molded with the sleeve being constantly in the normal position, molding defects are prevented.

(6) A method for manufacturing a closed-type tubular container having a head part with a closing material attached thereto formed onto a tubular body part by using a compression method, wherein a cup-shaped closing material having a convex section is fitted on a protrusion-like engagement section of a distal end of a mandrel so that a clearance is provided between a rear side of a distal end surface of the convex section of the closing material and a distal end of the engagement section of the mandrel, a molten resin is then disposed in a cavity of a molding die and a holepin having an outer peripheral section of a distal end that is smaller than an outer periphery of the distal end surface of the convex section of the closing material is pressed against the distal end surface of the convex section of the closing material, whereby the distal end surface of the convex section of the closing material is pleated to form an annular protrusion section of the outer peripheral section, the mandrel is inserted under pressure into the cavity of the molding die and the molten resin is caused to envelope the annular protrusion section, while being pushed and charged into the cavity, whereby the head part with the closing material attached thereto is formed, and a cap for the tube is then screwed on the head part with a screwing device.

(7) The present invention also provides the method for manufacturing a closed-type tubular container according to (6) above, wherein the clearance between the rear side of the distal end surface of the convex section of the closing material and the distal end of the engagement section of the mandrel is 0.5 mm to 5.0 mm. Furthermore, the clearance between the rear side of the distal end surface of the convex section of the closing material and the distal end of the engagement section of the mandrel is preferably 1.0 mm to 3.5 mm.

(8) The method for manufacturing a closed-type tubular container according to (6) or (7) above, wherein a concave section is formed in the distal end surface of the holepin.

(9) The method for manufacturing a closed-type tubular container according to any one of (6) to (8) above, wherein the distal end surface of the mandrel onto which the closing material is fitted is a convex curved surface.

(10) The method for manufacturing a closed-type tubular container according to any one of (6) to (9) above, wherein from the time when the mandrel is inserted under pressure into the cavity of the molding die until the time when the head part is molded and cooled thereafter, the mandrel is pressed to the cavity.

With such a manufacturing method, the head part of the tube is molded in a pressurized state till the cooling is ended. Therefore, a beautiful finished product can be obtained without radial peaks and valleys by the closing material with and without cover defects.

(11) The present invention also provides a closed-type tubular container in which a head part having attached thereto a cup-shaped closing material having a convex section is formed onto a tubular body part, wherein an annular protrusion section formed at the outer peripheral section of the distal end of the convex section of the closing material is embedded in the inner face of the head part, the protrusion length of the annular protrusion section is 0.1 to 1.5 mm, and the protrusion width is 2 to 3 times the thickness of an original sheet for the closing material.

In accordance with the present invention, because the outer peripheral section of the distal end of the closing material is strongly embedded in the head part, the closing material does not fall into the container when the closing material is pierced with a needle-shaped member as the tube is opened.

(12) The present invention also provides the closed-type tubular container according to (11) above, wherein the tubular body part is formed from a laminated sheet composed of polyester films laminated on both surfaces of a metal foil as a base material, the head part is formed from a polyester resin, and the closing material is composed of a laminated sheet using a metal foil as a base material and having the innermost layer formed from a polyester resin.

The laminated sheet of the body part of the tubular container in accordance with the present invention comprises a metal foil as a barrier layer and has polyester films on the inner and outer surfaces thereof, and a structure is preferred in which an aluminum foil is used as the metal foil, a non-oriented polyester resin film is laminated on the inner surface side thereof, a biaxially oriented polyester resin film is laminated on the outer surface side thereof, and a non-oriented polyester resin identical to that of the inner layer is laminated as the outermost layer. If necessary, a polyolefin resin layer may be provided as an interlayer to obtain flexibility. Furthermore, a polyurethane may be introduced as an adhesive layer between the layers.

As described above, the tubular container in accordance with the present invention uses a polyester resin for the entire inner surface of the head part and body part. Therefore, the tubular container demonstrates absolutely no adsorption of components from the contents that is in contact therewith, and no ethylene odor penetrates into the contents. In addition, because a metal foil is used as the barrier layer of the body part and a cup-shaped member produced by deep drawing of a laminated sheet having a metal foil as the base material is mounted on the inner surface side of the head part, the tubular container in accordance with the present invention has perfect gas barrier and light-shielding properties and also excels in chemical resistance. Thus, the tubular container in accordance with the present invention prevents the odorous and volatile components of the contents from escaping and, conversely, prevents oxygen from penetrating into the container. Therefore, the quality of the contents can be maintained over a long period.

Furthermore, the structural materials used in accordance with the present invention demonstrate excellent mechanical strength in both the body part and the head part, and a heat sealing ability necessary for performing operations during molding can be maintained. Furthermore, because the tubular container in accordance with the present invention is perfect in terms of gas barrier property, opaque and light-shielding ability, it is especially advantageous as a container for medicines and food in which the effective components can be modified by light.

An aluminum foil is preferred as a metal foil serving as the gas barrier layer. Furthermore, in the tubular container in accordance with the present invention, the cup-shaped closing material is mounted from the inner surface side of the head part and the contents are sealed.

If necessary the body part and head part of the tubular container in accordance with the present invention can be colored by blending a pigment.

(13) The present invention also provides the closed-type tubular container according to (11) above, wherein the closing material has been prepared by laminating a polyolefin resin film, a first biaxially oriented polyester film, a metal foil, a second biaxially oriented polyester film, and a film obtained by co-extruding and stretching polyolefin resin films sandwiching a polyamide film via adhesive layers, in that order, from an outer layer side.

In accordance with the present invention, a polyolefin resin film is used as the outermost layer. The polyolefin resin film has an elongation and resistance to rupture that are especially required for the outermost layer during drawing. The outermost layer of the closing material prior to attaching to the head part comes into contact with the external atmosphere and is joined to the inner surface of the head part of the tubular container by the compression method. Because the head part is often formed from polyethylene, polyethylene is preferably used as the polyolefin resin in order to attain good heat-weldability with the inner surface of the head part. Furthermore, among various types of polyethylene, linear low-density polyethylene (L-LDPE) is preferably used because it has an especially good drawing ability. Any polyolefin resin may be used, provided it has a good heat seal compatibility with the resin of the inner surface of the head part of the laminated tubular container, and low-density polyethylene (LDPE), high-density polyethylene (HDPE), ethylene-vinyl acetate copolymer (EVA), and polypropylene (CPP) film can be used.

A first biaxially oriented polyester film, a metal foil, and a second biaxially oriented polyester film are laminated in the order of description on the inner side (inner side of the outermost layer) of the polyolefin resin film. The first and second biaxially oriented polyester films play an important role of reinforcing the metal foil and also providing for the balance of strength on the inner and outer sides of the metal foil as a center. With those biaxially oriented polyester films, the closing material in accordance with the present invention can be provided with deep drawing ability that can be sufficiently adapted to actual production. PET is preferred as the polyester due to the availability, strength, toughness thereof and so on, but in addition thereto polyethylene isophthalate, polybutylene terephthalate, and polyethylene naphthalate can be also used. Typical foils such as an aluminum foil, a stainless steel foil, and a copper foil, or alloy foils, such as JIS 8079, etc., can be used as the metal foil. From the standpoints of availability, cost, elongation, etc., aluminum foil and aluminum alloy foil are especially preferred.

A co-extruded and stretched film with a three-layer structure in which a polyamide film is sandwiched between polyolefin resin films is disposed in the innermost layer of the closing material in accordance with the present invention. The polyolefin resin that is the substantially innermost layer is chemically inert, has high resistance to cracking, and prevents rupture during drawing. On the other hand, the polyamide sandwiched between the polyolefin films is more flexible than a polyester such as PET, etc., and inhibits the occurrence of pinholes during drawing. Furthermore, since it demonstrates strong durability against alkaline substances, no limitation is placed on the type of the contents.

Furthermore, since the three-layer structure film (three-layer film) has been subjected to co-extruding and stretching, the mechanical strength of the film can be further increased and rupture during drawing can be reliably prevented. In addition, the barrier effect against the permeation of contents also can be enhanced. The resistance to rupture during drawing should be combined with good cleaving property of the closing material during opening, but stretching provides for an elongation lower than that of the non-oriented film and, therefore, the cleaving easily occurs under the effect of a needle. Furthermore, biaxial orientation (biaxial stretching) of the film with the three-layer structure may be also conducted after co-extrusion. In the case of biaxial orientation, the cleavage will take place in two directions during opening. Therefore, the easiness of opening the closing material is greatly increased in comparison with the conventional closing material. The thickness of the entire three-layer film is preferably 15 to 60 µm, more preferably 20 to 30 µm. In this film, the central polyamide film preferably has a thickness of 8 µm or more, more preferably 9 to 15 µm. The three-layer film is usually laminated and formed by providing very thin layers of adhesive resin between the layers thereof.

Polyethylene is preferred as the polyolefin resin for use in the film with the three-layer structure, and for the reasons described above, linear low-density polyethylene is especially preferred. Nylon (Ny) is especially preferred as the polyamide because it has a high barrier capacity with respect to the permeation of contents and a high alkali resistance. Examples of suitable nylons include Nylon 6, Nylon 66, Nylon-11, and Nylon MXD6.

In the manufacture of the closing material in accordance with the present invention, the layers are preferably laminated by a dry lamination method via an adhesive. With respect to the polyolefin resin film, an extrusion lamination method may be used by which an anchor coat layer is coated on the film (for example, the PET surface) and an extrusion is conducted. Furthermore, the thickness of each layer is preferably 20 to 60 µm, more preferably 30 to 40 µm with respect to the polyolefin resin film. The first and second polyester films preferably have a thickness of 12 to 25 µm, but a sufficient effect is demonstrated at 12 µm. The metal foil preferably has a thickness of 30 to 70 µm, more preferably 40 to 60 µm. The preferred thickness of the three-layer film is presented above.

In the closed-type tubular container of the above-described configuration, the closing material contained therein has a high toughness and tensile strength and demonstrates no rupture during drawing. On the other hand, the cleaving property thereof during opening with an opening needle is improved and the container can easily be opened. Furthermore, excellent durability is demonstrated, even with the alkaline contents, and the closing material can be used for tubular containers for a variety of applications with any contents.

(14) The present invention also provides the closed-type tubular container according to (11) above, wherein the closing material has been prepared by laminating biaxially oriented polyester films or biaxially oriented polyamide films on both surfaces of a metal foil serving as a base material, and then laminating a non-stretched polyolefin resin film on at least one surface on the outer side of the laminated biaxially oriented polyester or polyamide films.

Polyethylene terephthalate is especially preferred for the polyester film used in accordance with the present invention because of its availability and so on, but this selection is not limiting and polyethylene isophthalate, polybutylene terephthalate, polyethylene naphthalate or the like can be also used. This polyester film is biaxially oriented and laminated on both surfaces of an aluminum foil. In accordance with the present invention, it is important that a non-stretched polyolefin film be then laminated on one or both surfaces of the polyester film. It is especially preferred that a linear low-density polyester film be used as the non-oriented polyolefin film.

(15) The present invention also provides the closed-type tubular container according to (11) above, wherein the closing material has been prepared by laminating biaxially oriented polyolefin films via adhesive layers on both surfaces of a metal foil, and laminating a biaxially oriented polyester film or biaxially oriented Nylon film via an adhesive layer at one or both interfaces between the metal foil and the biaxially oriented polyolefin films.

For example, an aluminum foil with a thickness of 20 to 60 µm can be advantageously used as the metal foil described in (15) above, and a biaxially oriented polypropylene film, a biaxially oriented high-density polyethylene film, or a biaxially oriented linear low-density polyethylene film having a thickness of 15 to 40 µm can be advantageously used as the biaxially oriented polyolefin film. A solvent-based or a solvent-free one-liquid or two-liquid curable urethane adhesive is preferred for the adhesive layer.

By fixing a biaxially oriented film via an adhesive on both sides of the metal foil, the metal foil is prevented from breaking and rupturing during deep drawing and excellent adhesion to the resin material at the shoulder part is attained.

Alternatively, a biaxially oriented polyolefin film identical to the above-described film is laminated on one surface of the aluminum film by using the same adhesive layer as described above and, on the other side of the aluminum film, a biaxially oriented polyester film or biaxially oriented Nylon film with a thickness of 12 to 25 µm is laminated via the above-described adhesive layer and then, on the surface thereof, the biaxially oriented polyolefin film is laminated via the adhesive.

In this laminated material, by laminating the biaxially oriented polyester or biaxially oriented Nylon, the metal foil is prevented from breaking and rupturing even more effectively, and those films, when laminated on the inner side of the tubular container, also improve the applicability to the contents. In accordance with the present invention, any surface of the laminated material may be in contact with the resin material of the head part, but from the standpoint of suitability for molding, it is preferred that the biaxially oriented polyester or biaxially oriented Nylon film be laminated on the inner layer side of the tube.

(16) The present invention also provides the closed-type tubular container according to any one of (11) to (15) above, wherein a foot section of the closing material is formed as a folded (turned) section to be embedded in the head part.

The closing material 22 is fitted inside the cavity of a molding die when the head part of the container is integrally molded with the body part 33 and they are integrally molded at the same time. Furthermore, as shown in FIG. 12, an annular foot of the closing material 22 forms folded section 39, 39 inside the head part 31. With such a structure, the cross-section of the end surface of the closing material is not exposed inside the tubular container, the closing material can be prevented from being eroded from this section, and gas generation induced by the reaction of the metal foil such as Al foil and the contents can be prevented.

(17) The present invention also provides the closed-type tubular container according to any one of (11) to (16) above, wherein the closed-type tubular container has a cap for a tube, i.e., a cap for the tube container, having a threaded section to be fitted onto the head part of the closed-type tubular container.

(18) The present invention also provides the closed-type tubular container according to (17) above, wherein the cap for the tube has a protrusion comprising a cone-like body having edge line sections in the vertical direction that are formed by the provision of concave curved surfaces at the circumferential side on the opposite side of the threaded section to be fitted into the head part and the edge surfaces of the edge line sections are each formed as a bulging arc face.

(19) The present invention also provides the closed-type tubular container according to (17) above, wherein the cap for the tube has a protrusion comprising a cone-like body having edge line sections in the vertical direction that are formed by the provision of concave curved surfaces at the circumferential side on the opposite side of the threaded section to be fitted onto the head part, the base section of the edge line is a bulging R-shape (i.e., bulging rounded shape), and the distal end section thereof is an inverse R-shape (i.e., inversely rounded shape).

The cone-like body may have a conical, bell-like, or pyramidal shape. Furthermore, a plurality of the concave curved surfaces can be formed, and the corresponding number of the edge line sections formed thereby is preferably 3 or 4. The most preferred number is 3. The edge line section formed by this concave curved surface is preferably such that the edge surface is formed to have a bulging arc face shape for reinforcement. Furthermore, the edge line itself may have a protruding R-shape at the base and an inverse R-shape at the distal end.

With such a structure of the cap for a tube, when the cap is used, the threaded joint with the head part on the tubular body part is released, the cap is turned over, the cone-like protruding section is inserted from the head part, and the closing material located inside is ruptured. As a result, the closing material is cleaved by a plurality of edge line sections and separated into small pieces. Because the small pieces are individually cut to have a small surface area and curled shape, the resistance to opening is decreased, and they do not cause narrowing and blocking of the passage which may occur under the pushing pressure generated when the contents is squeezed out of the tubular container.

FIGS. 13(a) to (f) illustrate an example of a cap for a tube. Receding sections 62 and 63 are provided above and below a cap body 61 for a tube, and a protrusion 64 for cleaving the closing material located inside the head part is provided inside the receding section 62. A threaded section 65 for screwing on the head part of the container is provided inside the receding section 63.

The distal end section of the protrusion 64 basically has a conical shape, as shown in FIGS. 14(a) to (c) and three edge line sections 67 are formed by three concave curved surfaces. The edge surface 68 is formed to have, as a whole, a bulging arc face shape. The edge line itself is divided into (a), (b) portions; the (a) portion at the base is rounded up into a bulging R-shape, thereby increasing the stability, while the (b) portion at the distal end is tipped by an inversely formed R-shape, thereby facilitating the rupture of the closing material.

FIG. 15 is another example of the cap for a tube in accordance with the present invention, wherein four edge line sections 67 are formed from the apex. This cap is effective with respect to tubular containers with a comparatively large diameter.

EFFECTS OF THE INVENTION

The effect attained by using the manufacturing method in accordance with the present invention is that a tubular container can be provided by a simple process in which, when a head part with a closing material attached thereto is formed at the tubular body part by using a compression method, an annular protrusion section can be formed at the outer peripheral section of the distal end surface of the convex section of the closing material by using stresses generated when a molten resin is pushed and filled under pressure, and this annular protrusion section can be enveloped with the molten resin, thereby forming a head part, and the closing material is prevented from falling into the container during opening.

EXPLANATION OF REFERENCE NUMERALS

Figure 1:
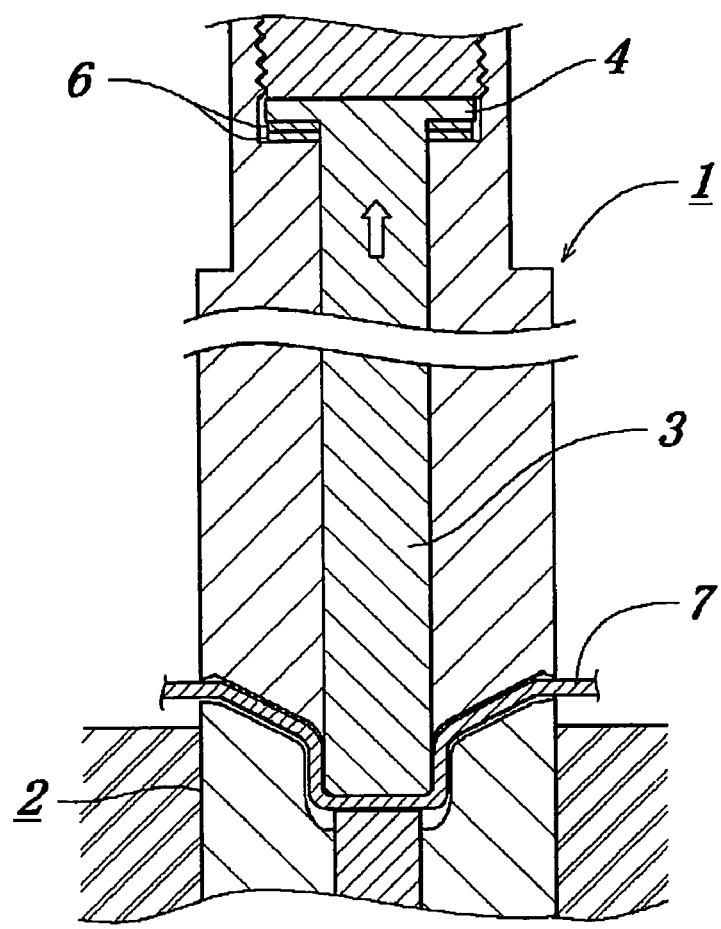
FIG. 1 is a cross-sectional view of a punching machine for deep drawing a closing material.

3: core pin
20: mandrel
21: engagement section
22: closing material
25: cavity
26: molten resin
27: holepin
30: annular protrusion section

BEST MODE FOR CARRYING OUT THE INVENTION

Tubular Body Part

An original sheet for a tube body was manufactured by laminating PET/PE/colored PE/PE, in the order of description, toward the outer side from an aluminum foil via EMAA on one surface of the aluminum foil and laminating a biaxially oriented PE/co-extruded sheet (LL/Ny/EVOH/Ny/LL) and L-LDPE, in the order of description, toward the inner side on the other surface of the aluminum foil. The tubular body part was then manufactured by cutting the original sheet for the tube section to a size of 80 mm×130 mm.

(Original Sheet for Closing Material)

Biaxially oriented PET (thickness 12 μm) was laminated via an adhesive on both surfaces of an aluminum foil (JIS 8079, thickness 50 μm). Then, a L-LDPE/Ny/L-LDPE three-layer co-extruded film (total thickness 20 μm, thickness of each layer: 5/10/5 μm) was laminated by a dry lamination method via an adhesive on the PET surface on one side, and L-LDPE (thickness 30 μm) was laminated by the same method of the PET surface on the opposite side. An original sheet for a closing material of a laminated tubular container in accordance with the present invention was thus manufactured. A two-liquid reactive-type urethane adhesive was used as the adhesive. The original sheet for the closing material that was thus produced had the following layer configuration from the side that is in contact with the external atmosphere: L-LDPE/biaxially oriented PET/Al/biaxially oriented PET/special composite film (L-LDPE/Ny/L-LDPE co-extruded biaxially oriented film) and had a total thickness of 124 μm.

(Deep Drawing)

With respect to the original sheet for a closing material that was produced in the above-described manner, deep drawing of the closing material was conducted by using a punching machine shown in FIG. 1.

FIG. 1 is a cross-sectional view of a punching machine for deep drawing of a closing material. In accordance with the present invention, in the process of molding the head part implemented by a compression method, which is the next step, fitting has to be conducted by providing a clearance between a rear side of the distal end surface of the convex section of the closing material and the distal end of the engagement section of the mandrel. Therefore, it is important to adjust the height of the convex section of the closing material during deep drawing of the closing material.

As shown in FIG. 1, the punching machine which can be used in the present invention comprises an upper die 1 and a lower die 2. A detachable core pin 3 is inserted in the upper die 1. The upper section of the core pin 3 is a flange 4. The core pin 3 is retracted in the direction shown by an arrow (upward direction in the figure) by increasing the number of washers 6 stacked below the flange 4, whereby the convex section of the closing material is lowered.

Figure 2:
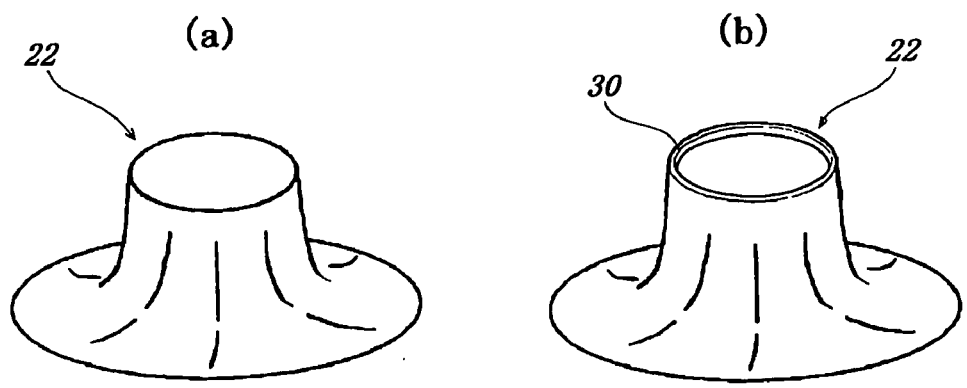
FIG. 2 is a perspective view illustrating the closing material after deep drawing, (a) illustrating the closing material to be fitted on the distal end of a mandrel, (b) being a perspective view of the closing material illustrating the annular protrusion portion in a state of being embedded in the head part after compression molding.

After the desired number of washers 6 have been stacked below the flange 4 of the core pin 3, the above-described original sheet 7 for a closing material is placed on the lower die 2. A cup-shaped closing material can be then molded by punching the original sheet 7 for a closing material with the upper die 1. FIG. 2(a) is a perspective view of a closing material 22 after deep drawing in which it was molded into a cup. FIG. 2(b) is a perspective view illustrating the stage of an annular protrusion section 30 embedded in a head part by using the below-described compression method.

(Head Part Molding)

Figure 3:
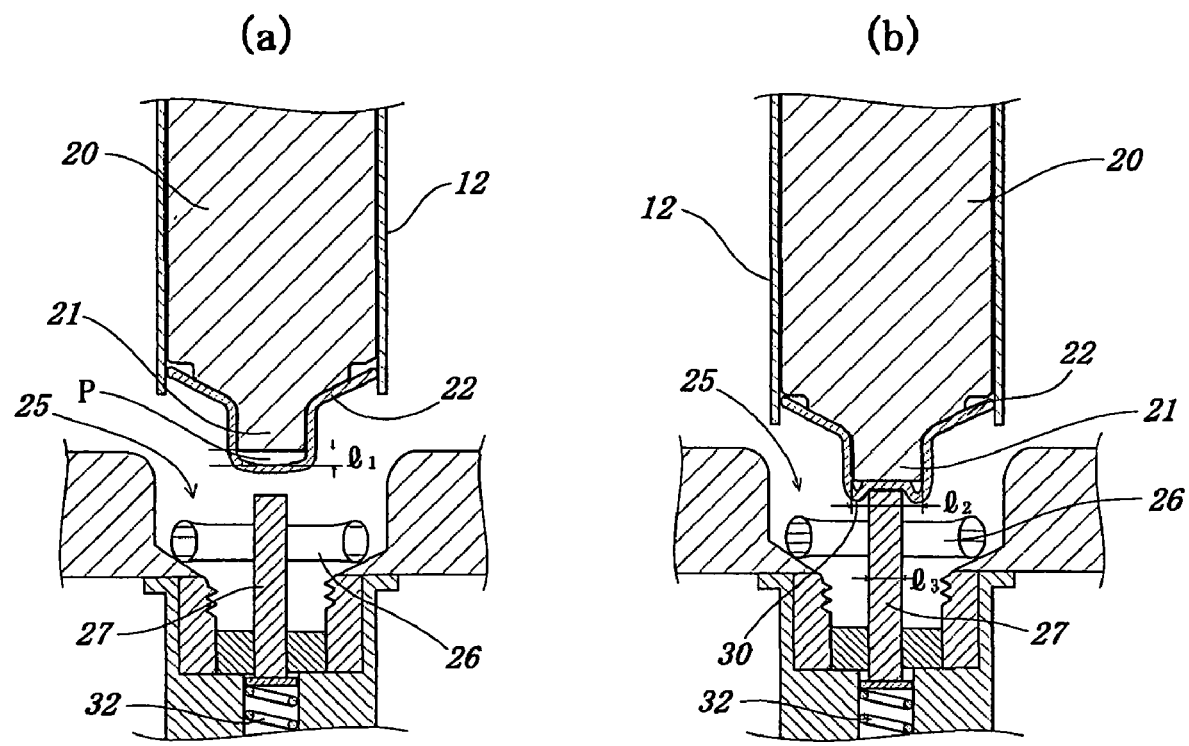
FIG. 3 is a cross-sectional view of a head part-molding machine for forming a head part onto the tubular body part.
Figure 4:
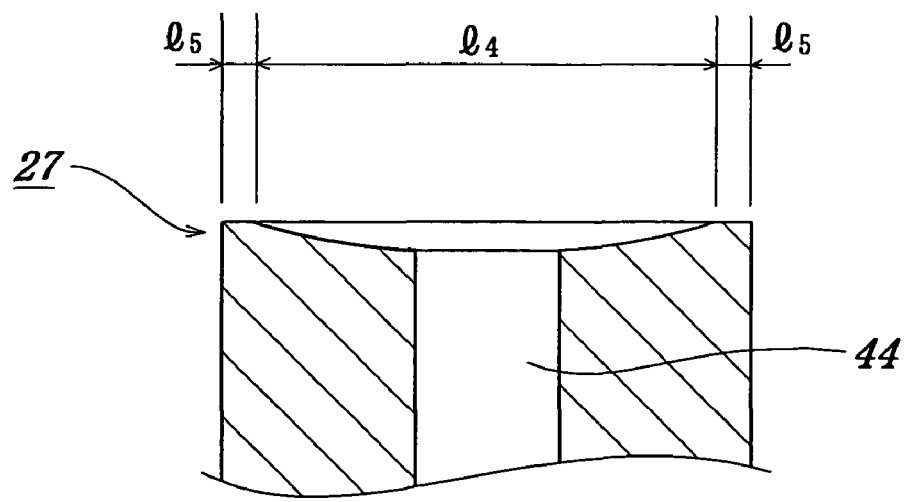
FIG. 4 is an enlarged cross-section of a holepin.
Figure 5:
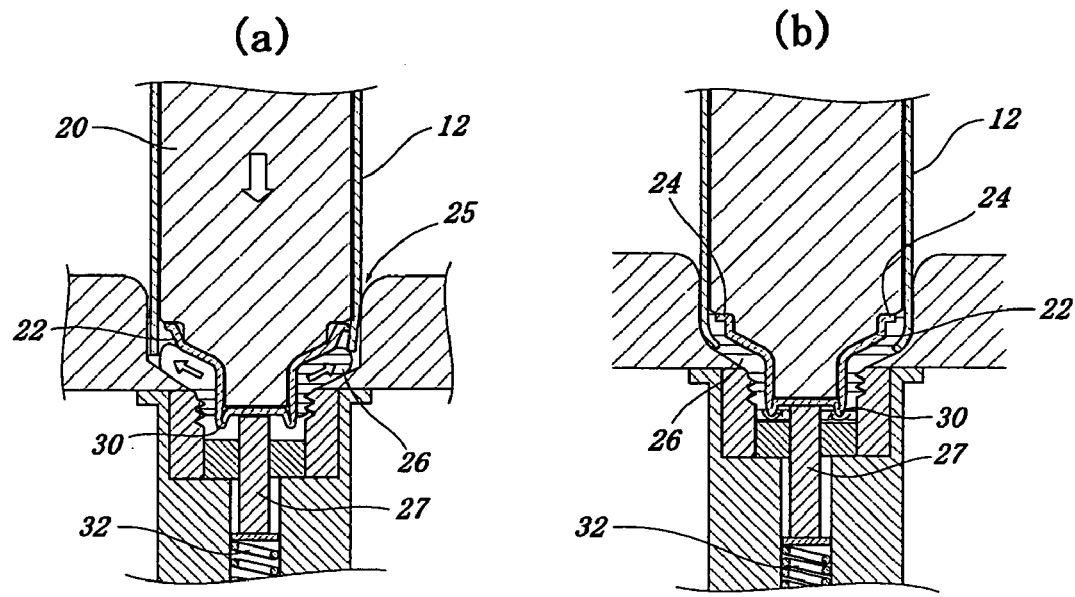
FIG. 5 is a cross-sectional view of the head-part molding machine for forming a head part onto the tubular body part.

FIG. 3 to FIG. 5 are cross-sectional views of a head part molding machine for forming a head part in a tubular body part by using a compression method.

As shown in FIG. 3(a), the cup-shaped closing material 22 molded by the above-described deep drawing process is fitted on a protrusion-shaped engagement section 21 of the distal end of a mandrel 20 covered on the outer peripheral surface thereof with a tubular body part 12. Because the closing material 22 is formed to have a total height larger by ($l_1$) than the height of the engagement section 21 of the mandrel 20, a clearance P is formed between the rear side of the distal end surface of the convex section of the closing material 22 and the distal end of the engagement section 21 of the mandrel 20. The maximum length of $l_1$ forming the clearance P depends of the tube diameter, diameter of the distal end of the mandrel, depth of the closing material, and design of the head part, and a large $l_1$ is generally set for a large tube diameter; preferably it is set at 0.5 to 5.0 mm. More preferably, 1.0 to 3.5 mm. When $l_1$ is less than 0.5 mm, the protrusion length of the annular protrusion section decreases, and when $l_1$ exceeds 5.0 mm, folding for the formation of the annular protrusion section becomes difficult or the distal end of the annular protrusion section may project outward through the surface of the head part.

A molten resin 26 is then disposed around a holepin 27 inside a cavity 25 of a molding machine. A high-density polyethylene resin was used as the molten resin 26. Then, as shown in FIG. 3(b), the holepin 27 having a distal end diameter $l_3$ (diameter 8.0 mm) that is less than a diameter $l_2$ (diameter 11.4 mm) of the distal end surface of the engagement section 21 of the mandrel 20 is pressed against the distal end surface of the convex section of the closing material 22, whereby the distal end surface of the holepin 27 pushes the central portion of the distal end surface of the convex section of the closing material 22, thereby forming the annular protrusion section 30 to a certain degree. A coil spring 32 is present in the base section of the holepin 27 and an elastic pressure is generated when the holepin is pressed against the closing material.

FIG. 4 is an enlarged view of the distal end surface of the holepin 27. A concave section having an R curved surface is formed on the distal end surface of the holepin 27. A diameter $l_4$ of the concave section is 7.6 mm, and a width $l_5$ of the outer peripheral section is 0.2 mm. A communicating hole 44 is drilled in the axial direction of the holepin from the central section of the curved surface.

Further, as shown in FIG. 5(a), the mandrel 20 is pressed into the cavity 25 of the molding machine, and the molten resin 26 is pushed into the cavity 25 and fills it. Under the pressure created by the mandrel 20, the molten resin 26 initially spreads in the direction shown by arrows (toward the outer periphery, as shown in the figure) and forms a portion corresponding to a shoulder section of the tubular container.

Then, as shown in FIG. 5(b), the molten resin 26 advances vertically toward the outer side of the annular protrusion section 30 and envelopes the annular protrusion section so as to wrap around in the direction of an arrow from the protruding end of the annular protrusion section 30. At this time, the annular protrusion section 30 receives a balanced pushing pressure from the outer circumferential side and inner circumferential side of the annular section, whereby the distal end surface of the convex section of the closing material 22 is bent. As a result, a thin annular protrusion section 30 that is formed uniformly from the base to the distal end is formed.

The above-described process makes it possible to form a head part in which the closing material is attached with a sufficient joining strength to the tubular body part. Furthermore, a foot section 24 of the closing material was inserted into the molten resin 26 on the inner side of the tubular body part 12 and, therefore, it is possible to prevent the permeation of the contents from the cross-section which may be caused due to the exposure of the end section of the head part formed by the molten resin 26.

Figure 6:
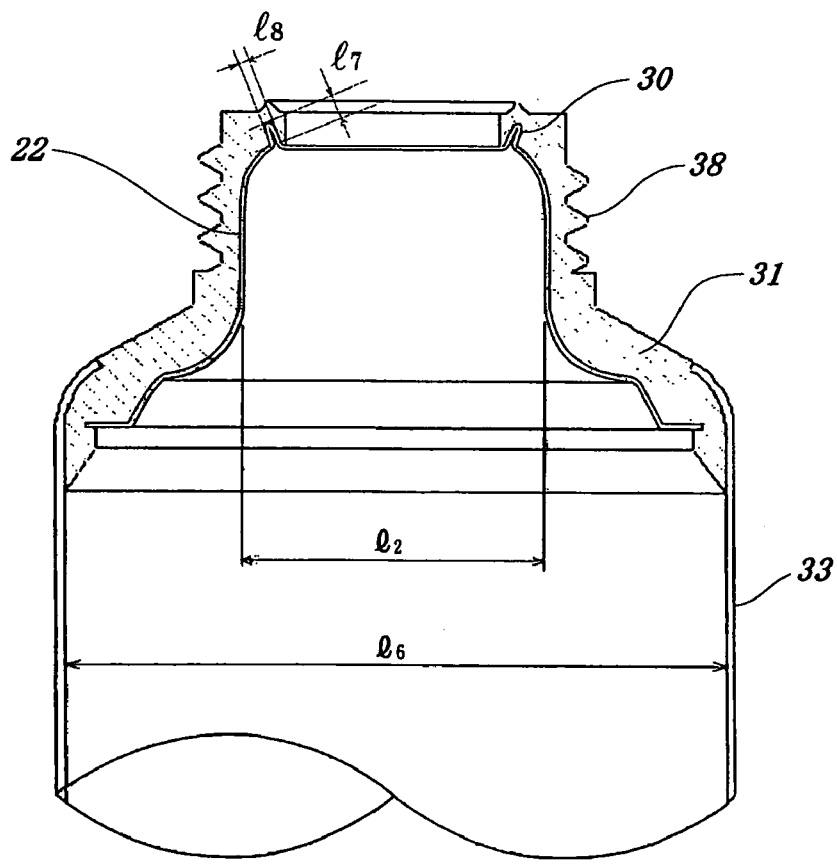
FIG. 6 is a cross-sectional view illustrating a state of the head part in the tubular container in accordance with the present invention.

FIG. 6 is a cross-sectional view illustrating the state of the formed head part.

As shown in FIG. 6, a head part 31 is formed by the molten resin at the distal end of the tubular body part 33. A threaded section 38 for screwing the below-described cap is formed in the head part 31. Furthermore, the closing material 22 is bonded to the inner side of the head part 31, and the annular protrusion section 30 is formed in the vicinity of the open section. Here, the protrusion length $l_7$ of the annular protrusion section 30 varies depending on the size and design of the container, but is preferably 0.1 to 1.5 mm in tubular containers with a diameter ($l_6$) of 13 mm to 40 mm, which is a typical body diameter. More preferably the protrusion length is 0.2 to 1.0 mm and even more preferably 0.3 to 0.8 mm. The protrusion length $l_7$ of the annular protrusion section depends on the depth of the closing material, but when it exceeds 1.5 mm, it hinders the wraparound of the molten resin 26 in the direction shown by an arrow in FIG. 5(b). There is also a risk of the annular protrusion section 30 protruding from the distal end of the head part beyond the distal end of the open section. Furthermore, when the protrusion length $l_7$ of the annular protrusion section 30 is less than 0.1 mm, the retaining effect is reduced and there is a risk of the closing material 22 falling into the tubular container in the opening process.

The protrusion width ($l_8$) depends on the thickness of the original sheet of a closing material, but is preferably formed to be 2 to 3 times the thickness of the original sheet for a closing material, more preferably 2 to 2.5 times the thickness of the original sheet for a closing material.

(Closed Tubular Container)

Figure 7:
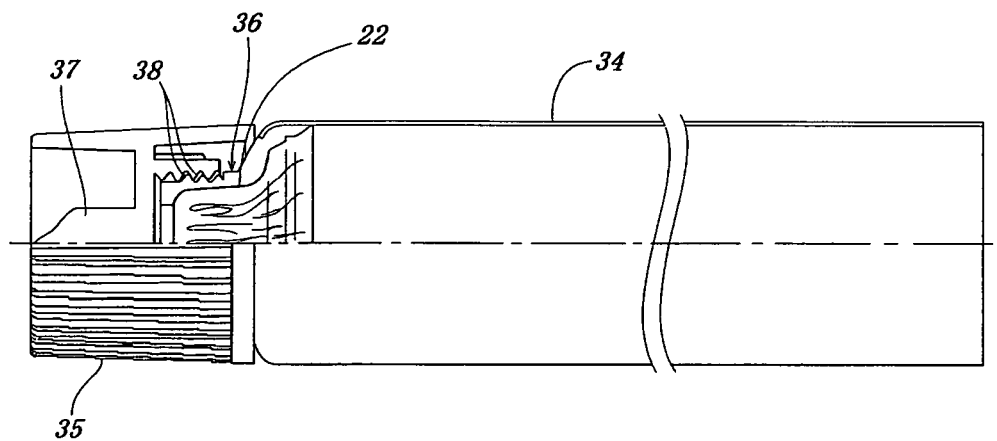
FIG. 7 is a schematic view illustrating the tubular container in accordance with the present invention with a cap attached thereto.
Figure 8:
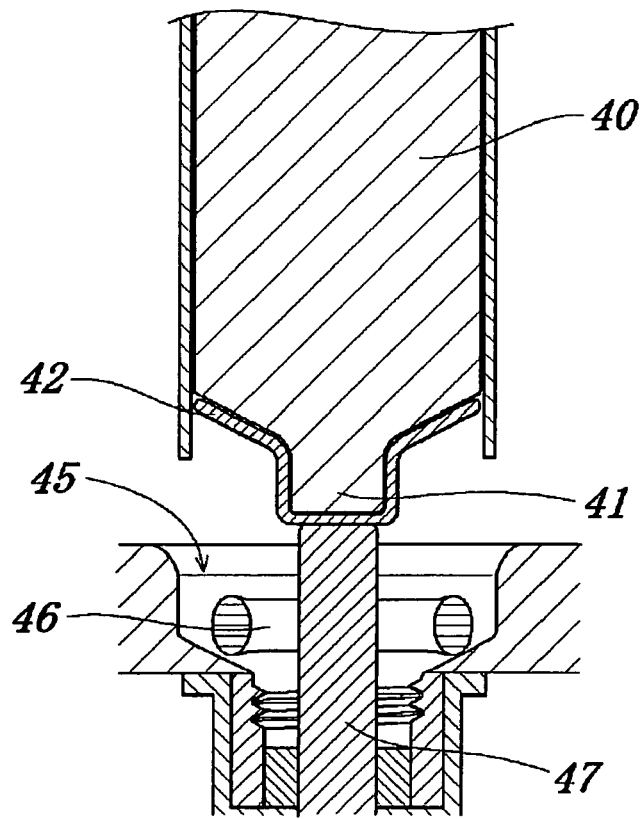
FIG. 8 is a cross-sectional view of a conventional head-part molding machine for forming a head part onto a tubular body part and shows the distal end section in a mandrel for fitting the closing material.
Figure 9:
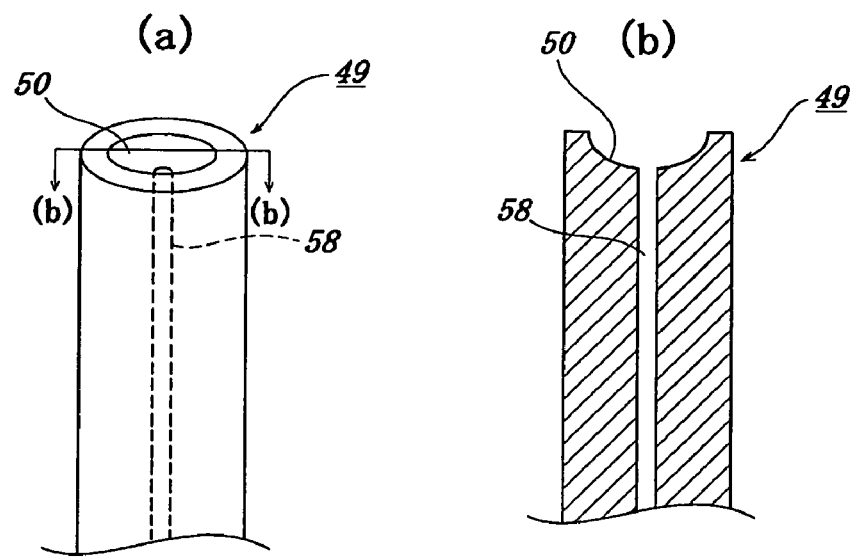
FIG. 9 illustrates an example of the holepin used in the invention of claim 3, (a) being a perspective view, (b) being a cross-sectional view along b-b.
Figure 10:
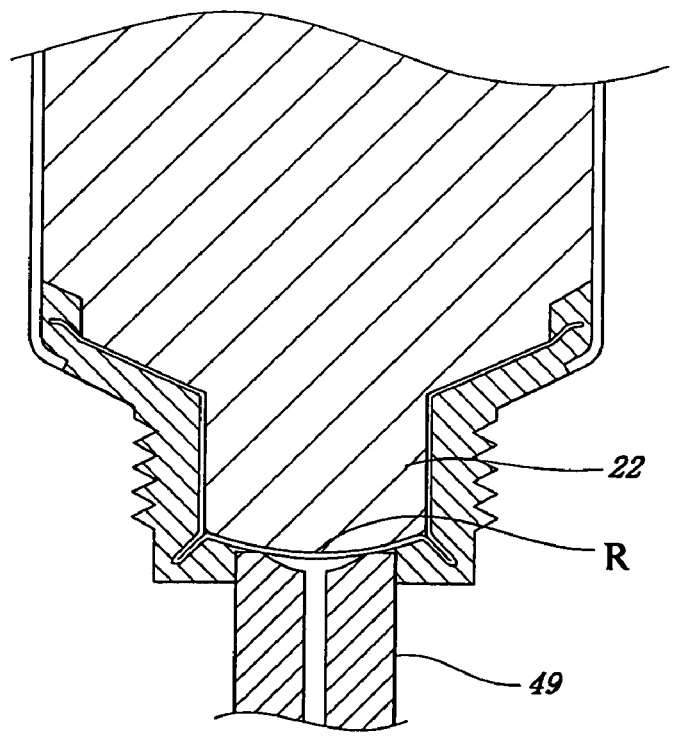
FIG. 10 is a cross-sectional view illustrating the distal end structure of a mandrel used in the present invention.
Figure 11:
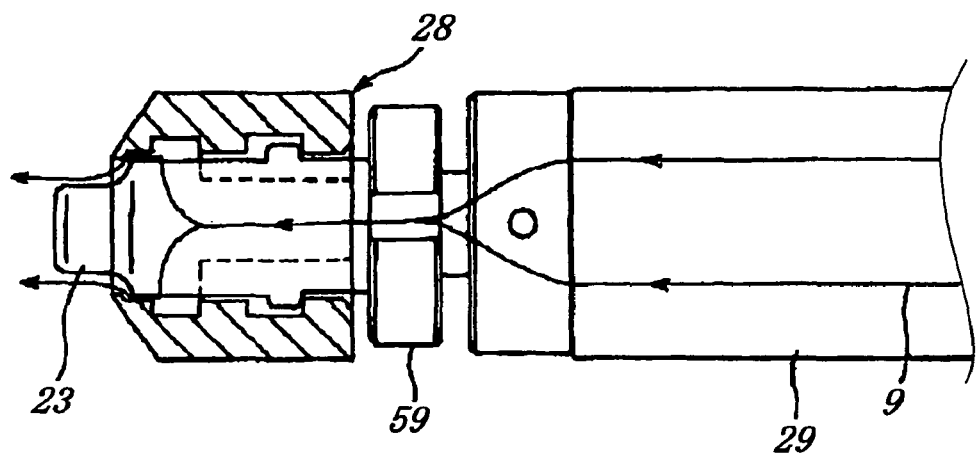
FIG. 11 shows the mandrel structure illustrating the state in which the sleeve used in the present invention has advanced forward with respect to the stationary part.
Figure 12:
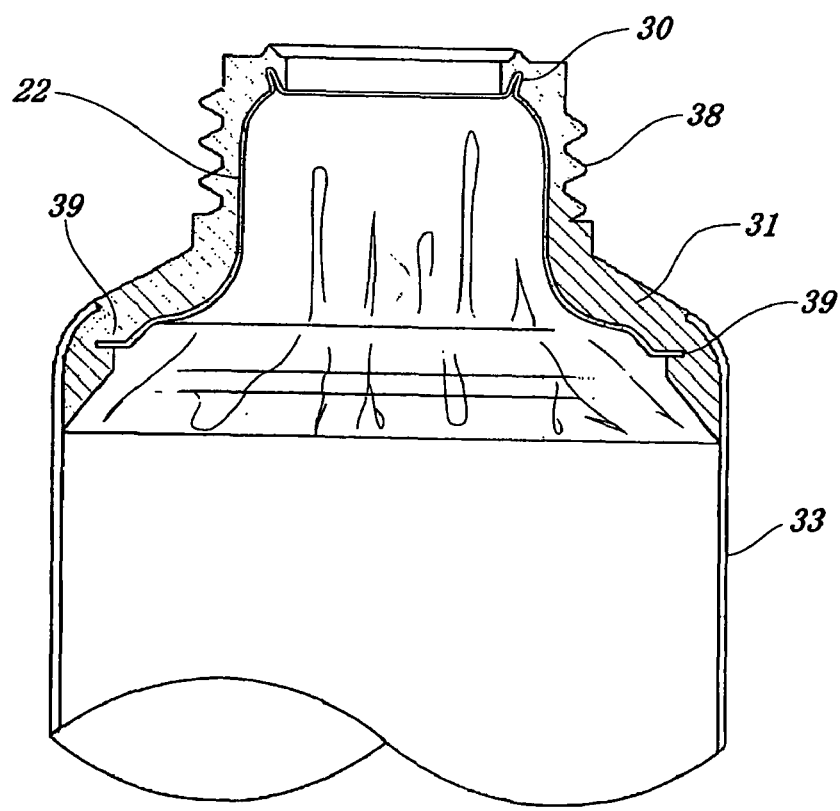
FIG. 12 is a cross-sectional view illustrating a state where a foot section of the closing material is embedded in the head part.
Figure 13:
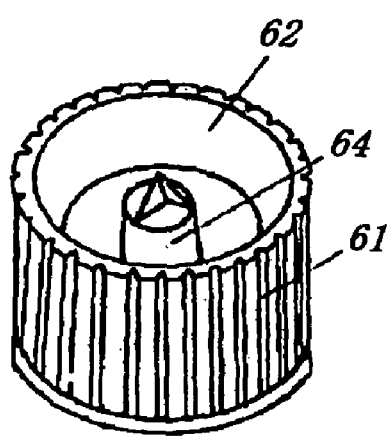
FIG. 13 shows an example of a cap for tube in accordance with the present invention, (a) being a perspective view, (b) being a plan view, (c) being a cross-sectional view, (d) being a side view, (e) being a perspective view as viewed from the bottom side, (f) being a bottom surface view.
Figure 13:
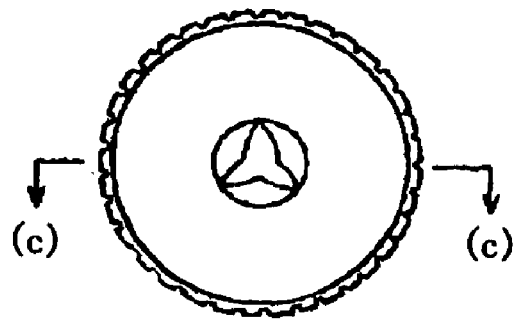
Figure 13:
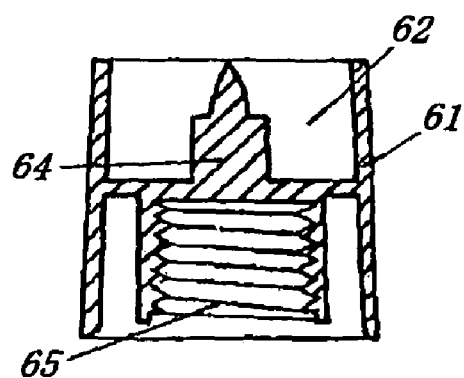
Figure 13:
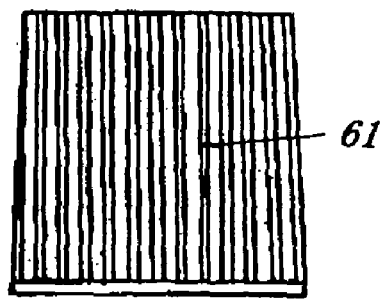
Figure 13:
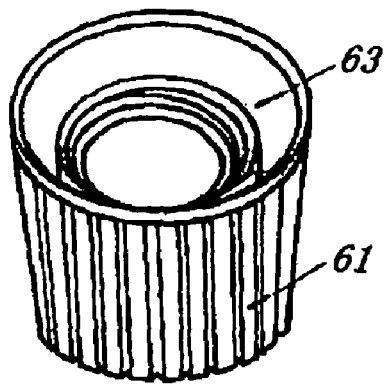
Figure 13:
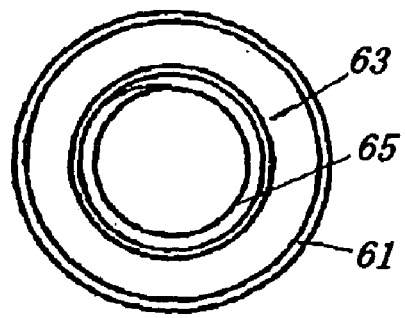
Figure 14:
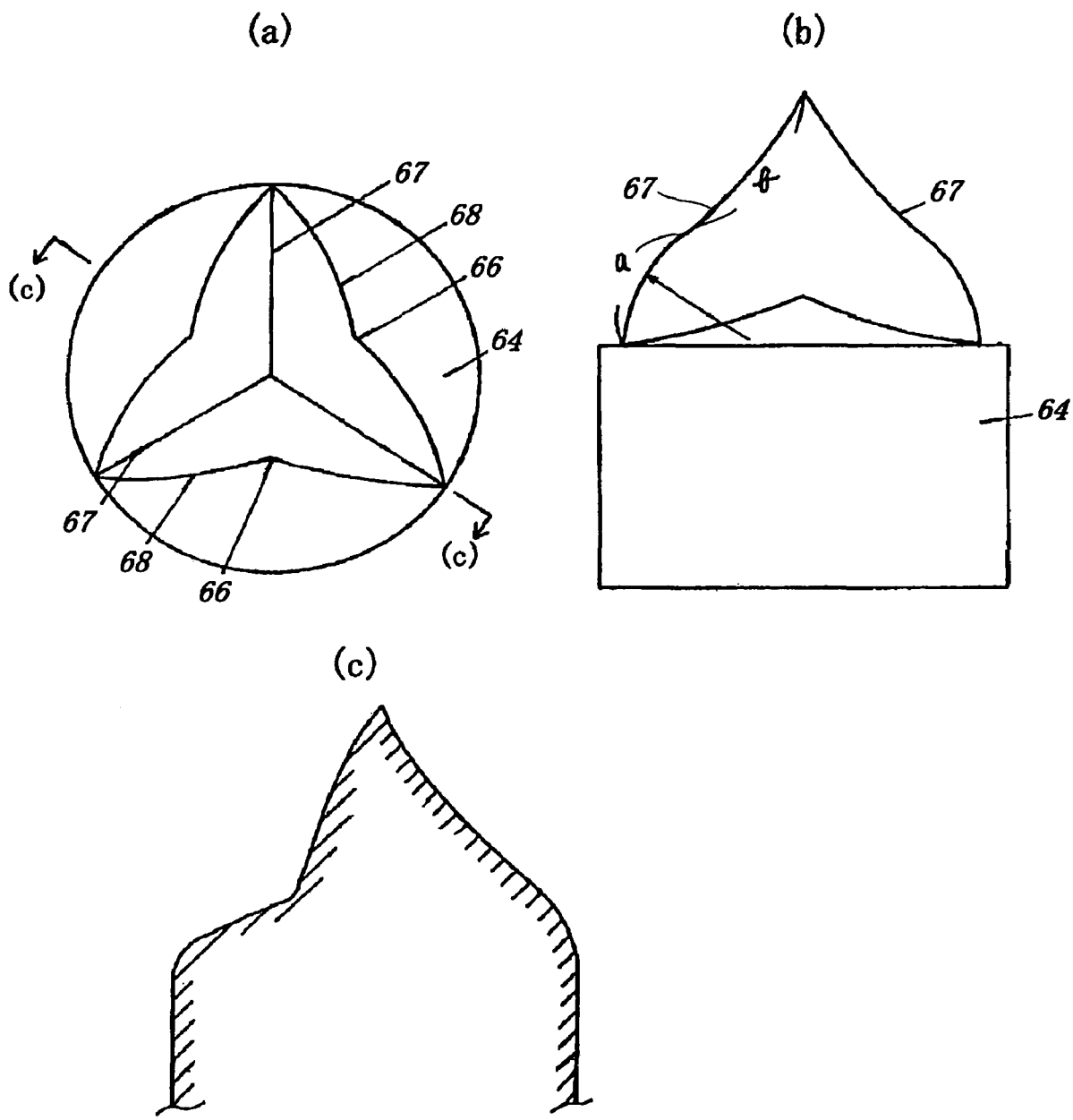
FIG. 14 shows a protrusion for piercing the closing material.
Figure 15:
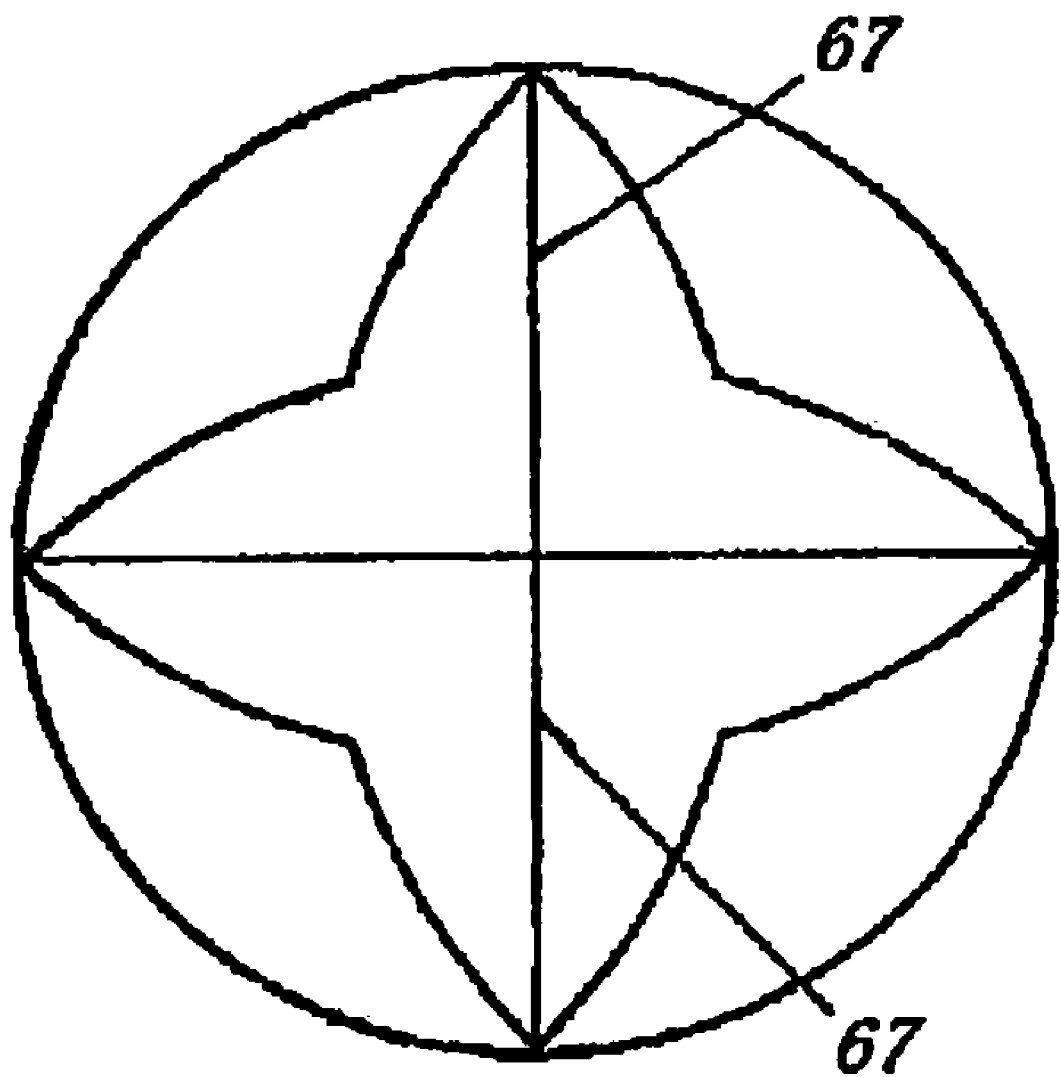
FIG. 15 is a plan view illustrating another example of a cap for tube in accordance with the present invention.

The process for manufacturing a closed tubular container in which a cap was attached to the tube manufactured by the above-described compression method will be described with reference to FIG. 7. The upper half of FIG. 7 is a transparent view illustrating the inner state of the cap and tubular container (in particular, the head part).

The tubular container 34 with a formed head part 36 is fitted on the mandrel, and a cap 35 is screwed on the head part 36 of the tubular container 34 with a screwing device (not shown in the figure). A needle-shaped member 37 for piercing the closing material 22 is formed in the concave section formed above the cap 35. The cap 35 is engaged with the threaded section 38 of the head part 36 of the tubular container and screwed on the tubular container 34 so as to cover the upper surface of the closing material 22 in the opening of the head part.

Embodiment

A tubular body part for a body diameter ($l_6$) size of 25 mm and an original sheet for a closing material were manufactured by the methods described in the aforementioned implementation mode.

Deep drawing was then conducted by using a punching machine. In the course of deep drawing, three types of closing materials were prepared: (i) a washer was not screwed on a core pin; (ii) one washer (thickness 0.4 mm) was screwed; (iii) two washers were screwed. A total of 18 closing materials (6 of each type) were manufactured.

The height of the convex section of the manufactured closing materials was measured and an average value was found. The respective values were as follows: (i) 12.88 mm, (ii) 12.44 mm, and (iii) 12.09 mm.

The tubular body part was then placed on the mandrel of the head-molding machine shown in FIG. 3(a), the above-described closing materials were successively fitted on the engagement section of the mandrel, and head parts were formed on the tubular body parts by a compression method. In this process, three types (0.9 g, 1.1 g, 1.3 g) of a molten resin (HJ362, manufactured by Japan Polyethylene Corp.) were prepared, holepins of two diameters (8 mm and 4 mm) were prepared, and tubular containers were manufactured by using combinations as shown in Table 1.

The manufactured tubular containers were cut in the axial direction and the cross-sections thereof were exposed to obtain samples No. 1 to 18. The protrusion length and protrusion width of the annular protrusion sections in the cross-sections of the samples were measured. The manufacturing conditions and measurement results for the tubular containers are shown in Table 1. Here, a numerical value obtained by measuring only the aluminum foil portion with a gauge and adding the thickness of other layers is presented as the protrusion width.

In a tubular container having a closing material with a protrusion length of the annular protrusion section of more than 1.5 mm, the flow of molten resin during compression molding was inhibited, the protrusion section was exposed on the upper surface of the opening, and only products with a significantly degraded external appearance could be obtained. On the other hand, when the protrusion length was below 0.1 mm, the retaining effect by the protrusion was greatly degraded and the closing material was found to fall off during opening.

TABLE 1

| Sample No. | Washer (mm) | Height of convex section of closing material | Holepin diameter (Φ mm) | Amount of molten resin (g) | Protrusion width (mm) | Protrusion length (mm) | Falling down | External appearance |
|---|---|---|---|---|---|---|---|---|
| 1 | 0 | High | 8 | 1.3 | 0.25 | 0.64 | ○ | ○ |
| 2 | 0 | High | 8 | 1.1 | 0.27 | 0.64 | ○ | ○ |
| 3 | 0 | High | 8 | 0.9 | 0.34 | 0.54 | ○ | ○ |
| 4 | 0 | High | 4 | 1.3 | 0.29 | 0.55 | ○ | ○ |
| 5 | 0 | High | 4 | 1.1 | 0.26 | 0.59 | ○ | ○ |
| 6 | 0 | High | 4 | 0.9 | 0.28 | 0.53 | ○ | ○ |
| 7 | 0.4 | Medium | 8 | 1.3 | 0.25 | 0.50 | ○ | ○ |
| 8 | 0.4 | Medium | 8 | 1.1 | 0.26 | 0.51 | ○ | ○ |
| 9 | 0.4 | Medium | 8 | 0.9 | 0.33 | 0.47 | ○ | ○ |
| 10 | 0.4 | Medium | 4 | 1.3 | 0.28 | 0.47 | ○ | ○ |
| 11 | 0.4 | Medium | 4 | 1.1 | 0.29 | 0.45 | ○ | ○ |
| 12 | 0.4 | Medium | 4 | 0.9 | 0.32 | 0.42 | ○ | ○ |
| 13 | 0.8 | Low | 8 | 1.3 | 0.28 | 0.30 | ○ | ○ |
| 14 | 0.8 | Low | 8 | 1.1 | 0.30 | 0.30 | ○ | ○ |
| 15 | 0.8 | Low | 8 | 0.9 | 0.36 | 0.31 | ○ | ○ |
| 16 | 0.8 | Low | 4 | 1.3 | 0.30 | 0.30 | ○ | ○ |
| 17 | 0.8 | Low | 4 | 1.1 | 0.33 | 0.27 | ○ | ○ |
| 18 | 0.8 | Low | 4 | 0.9 | 0.35 | 0.22 | ○ | ○ |

The above-described results demonstrate that the samples with the longest annular protrusion sections are samples No. 1 and No. 2 (0.64 mm) that are followed in the order of descending by samples No. 5, 4, 3, 6, 8, 7, 10, 9. The sample with the shortest annular protrusion section is sample No. 18 (0.22 mm), followed in the order of ascending by samples No. 17, 16, 14, 13, 15, 12, 11.

Samples with a narrowed annular protrusion section are sample Nos. 1 and 7, followed in the order of ascending by sample Nos. 8, 5, 2, 10, 6, 13, 4, 11. A sample with a wide annular protrusion section is sample No. 15, followed in the order of descending by sample Nos. 18, 3, 17, 9, 12, 16, 14.

The above-described measurement results demonstrate that samples with a high convex section (a small number of washers) of the closing material tended to have a longer annular protrusion section. Furthermore, when the height of the convex section of the closing material was the same, the samples with a large holepin diameter tended to have a longer annular protrusion section.

Furthermore, samples with a small amount of molten resin were found to demonstrate a wide annular protrusion section. When the amount of molten resin was the same, samples with a lower convex section of the closing material tended to have a wide annular protrusion section.

Controlling the parameters that were clarified with the above-described measurement results makes it possible to obtain a closed-type tube suitable for food, seasonings, cosmetics, drugs, toothpaste, cream, and the like, this tube being capable of withstanding deep drawing and being provided with a functional property enabling it to be reliably opened with a needle-shaped member.

What is claimed is:

1. A method of forming a closed tube head part having a closing material attached thereto by a compression method, the method comprising the steps of:
    fitting a cup-shaped closing material having a convex section and a metal foil base material onto a protruding engagement section of a distal end of a mandrel in a manner that a clearance is provided between a rear side of a distal end surface of the convex section of the closing material and the protruding engagement section of the distal end of the mandrel;
    disposing a molten resin in a cavity of a molding die;
    pressing a holepin having an outer peripheral section of a distal end that is smaller than the outer periphery of the distal end section of the convex section of the closing material against a central portion of the distal end surface of the convex section of the closing material to pleat the distal end surface of the convex section of the closing material and form an annular corner protrusion at its outer peripheral section; and
    inserting the mandrel under pressure into the cavity of the molding die while the holepin remains pressed to cause the molten resin to be pushed and charged into the cavity such that the molten resin envelops and flows completely over the annular corner protrusion section to become interlocked therewith, thus forming the closed tube head part with the closing material attached thereto.

2. The method of forming a head part according to claim 1, wherein the clearance between the rear side of the distal end surface of the convex section of the closing material and the distal end of the engagement section of the mandrel is 0.5 mm to 5.0 mm.

3. The method of forming a head part according to claim 1, wherein a concave section is formed in the distal end surface of the holepin.

4. The method of forming a head part according to claim 1, wherein the distal end surface of the mandrel onto which the closing material is fitted is a convex curved surface.

5. A method of manufacturing a closed tubular container having a head part with a closing material attached thereto by a compression method, the method comprising the steps of:
    filling a cup-shaped closing material having a convex section and a metal foil base material onto a protruding engagement section of a distal end of a mandrel in a manner that a clearance is provided between a rear side of a distal end surface of the convex section of the closing material and the protruding engagement section of the distal end of the mandrel;
    disposing a molten resin in a cavity of a molding die;
    pressing a holepin having an outer peripheral section of a distal end that is smaller than the outer periphery of the distal end section of the convex section of the closing material against a central portion of the distal end surface of the convex section of the closing material to pleat the distal end surface of the convex section of the closing material and form an annular corner protrusion at its outer peripheral section;
    inserting the mandrel under pressure into the cavity of the molding die while the holepin remains pressed to cause the molten resin to be pushed and charged into the cavity such that the molten resin envelops and flows completely over the annular corner protrusion section to become interlocked therewith, thus forming the closed tube head part with the closing material attached thereto; and
    screwing a cap on the head part with a screwing device.

6. The method for manufacturing a closed tubular container according to claim 5, wherein the clearance between the rear side of the distal end surface of the convex section of the closing material and the distal end of the engagement section of the mandrel is 0.5 mm to 5.0 mm.

7. The method for manufacturing a closed tubular container according to claim 5, wherein a concave section is formed in the distal end surface of the holepin.

8. The method for manufacturing a closed tubular container according to claim 5, wherein the distal end surface of the mandrel onto which the closing material is fitted is a convex curved surface.

9. The method for manufacturing a closed tubular container according to claim 5, wherein from the time when the mandrel is inserted under pressure into the cavity of the molding die until the time when the head part is molded and cooled thereafter, the mandrel is pressed into the cavity.

* * * * *